US011966047B2

(12) United States Patent
Arvidsson

(10) Patent No.: US 11,966,047 B2
(45) Date of Patent: Apr. 23, 2024

(54) EYE TRACKING SYSTEM FOR REDUCING UNWANTED REFLECTIONS FROM AN OPTIC ARRANGEMENT

(71) Applicant: Tobii AB, Danderyd (SE)

(72) Inventor: Magnus Arvidsson, Danderyd (SE)

(73) Assignee: Tobii AB, Danderyd (SE)

( * ) Notice: Subject to any disclaimer, the term of this patent is extended or adjusted under 35 U.S.C. 154(b) by 653 days.

(21) Appl. No.: 17/034,631

(22) Filed: Sep. 28, 2020

(65) Prior Publication Data

US 2021/0097319 A1 Apr. 1, 2021

(30) Foreign Application Priority Data

Sep. 27, 2019 (SE) .................................. 1951098-1

(51) Int. Cl.
| | | |
|---|---|---|
| *G02B 27/00* | (2006.01) | |
| *G02B 27/28* | (2006.01) | |
| *G06V 40/18* | (2022.01) | |
| *G06V 40/19* | (2022.01) | |

(52) U.S. Cl.
CPC ....... *G02B 27/0093* (2013.01); *G02B 27/283* (2013.01); *G02B 27/288* (2013.01); *G06V 40/18* (2022.01); *G06V 40/19* (2022.01); *G06V 40/193* (2022.01)

(58) Field of Classification Search
CPC .............. G02B 27/0093; G02B 27/283; G02B 27/288; G06V 40/19; G06V 40/193; G06V 40/18
USPC .......................................................... 382/103
See application file for complete search history.

(56) References Cited

U.S. PATENT DOCUMENTS

| | | | |
|---|---|---|---|
| 10,108,261 B1 | 10/2018 | Hall et al. | |
| 10,324,529 B1 | 6/2019 | Rana et al. | |
| 2006/0238707 A1 | 10/2006 | Elvesjo et al. | |
| 2015/0061995 A1 | 3/2015 | Gustafsson et al. | |
| 2015/0310253 A1* | 10/2015 | Agrawal | H04N 23/11 382/103 |
| 2018/0140187 A1* | 5/2018 | Watanabe | G06V 40/19 |

FOREIGN PATENT DOCUMENTS

| | | |
|---|---|---|
| CN | 106324831 A | 1/2017 |
| CN | 206321882 U | 7/2017 |

OTHER PUBLICATIONS

CN202010979154.5, "Office Action", dated Apr. 18, 2022, 7 pages.
SE1951098-1, "Office Action", dated Mar. 9, 2020, 7 pages.

\* cited by examiner

*Primary Examiner* — Alexander P Gross
*Assistant Examiner* — William D Peterson
(74) *Attorney, Agent, or Firm* — Christopher Ignatius Moylan

(57) ABSTRACT

The present disclosure generally relates to the field of eye tracking systems. An eye tracking system is provided. The eye tracking system comprises an illuminator arrangement, including at least one light source, configured to illuminate an eye of a user. The eye tracking system is configured to enable a reduction of reflections from an optic arrangement (e.g., a pair of glasses) that is located in a light beam path between the illuminator arrangement and the eye when the eye tracking system is in use. The illuminator arrangement is configured to emit p-polarized light to be incident on a surface of the optic arrangement at an angle corresponding to, or substantially corresponding to, Brewster's angle.

11 Claims, 7 Drawing Sheets

EYE TRACKING SYSTEM FOR REDUCING UNWANTED REFLECTIONS FROM AN OPTIC ARRANGEMENT

CROSS-REFERENCES TO RELATED APPLICATIONS

This application claims priority to Swedish Application No. 1951098-1, filed Sep. 27, 2019; the content of which are hereby incorporated by reference.

TECHNICAL FIELD

The present disclosure generally relates to the field of eye tracking systems. In particular, the present disclosure relates to an eye tracking system implemented in a Head Mounted Device (HMD), e.g. a Virtual Reality (VR) device or an Augmented Reality (AR) device. More specifically, this disclosure presents an improved eye tracking system for reducing unwanted reflections from an optic arrangement.

BACKGROUND

In eye tracking applications, digital images are generally retrieved of the eyes of a user and the digital images are analyzed in order to estimate the gaze direction of the user. There exist different methods for achieving such an estimation of the gaze direction. In some methods, ambient light is used when retrieving images of the eyes of the user and in some methods additional light sources (illuminators) are used to illuminate the eyes for retrieving images of the eyes of the user. Generally, the estimation of the gaze is based on identification of the pupils of the eyes of the user, together with identification of glints (corneal reflections) in the eyes of the user. In order to identify a pupil of an eye in an image of the eye, the contrast between a representation of the pupil and a representation of an iris of the eye in the image must typically be sufficient.

One existing method of eye tracking includes the use of Infrared (IR) light and an image sensor. The IR light is directed towards the pupil of a user and the reflection of the light is captured by an image sensor. Through analysis of the reflection point, the direction of the user's gaze may be calculated. One example of such system is disclosed in European Patent No. 1 562 469. European Patent No. 1 562 469 is incorporated herein by reference to give context to this disclosure.

Portable or wearable eye tracking devices have also been previously developed. One example of such eye tracking system is disclosed in U.S. Pat. No. 9,041,787. This patent describes a wearable eye tracking using illuminators and image sensors for determining gaze direction. U.S. Pat. No. 9,041,787 is incorporated herein by reference to give context to this disclosure.

In applications of eye tracking for portable or wearable eye tracking devices, such as in HMDs (e.g., VR/AR devices), where head mounted devices are used which include an eye tracking system determining an eye direction and/or gaze direction based on a pupil center and corneal reflections from illuminators illuminating a user's eyes, challenges may typically arise for example for a user who is wearing a pair of glasses under the VR headset. For example, one or more reflections from an optic arrangement caused by the one or more of the illuminators, i.e. false glints, may result in a situation where the pupil cannot be accurately identified, or where no or too few corneal reflections are identified for the eye tracking. In such situations it will be difficult, or sometimes even impossible, to determine eye direction and/or gaze direction or at least not with desirable reliability.

SUMMARY

It is in view of the above considerations and others that the various embodiments disclosed throughout this disclosure have been made.

As indicated above, some existing solutions are inadequate in that one or more reflections from an optic arrangement caused by the one or more of the illuminators may result in a situation where the pupil cannot be accurately identified or where no or too few corneal reflections can be identified for eye tracking. The reflections from said optic arrangement are therefore unwanted reflections.

The present disclosure recognizes that it would be desirable to provide an eye tracking technology to account for situations where unwanted reflections from an optic arrangement could potentially reduce the accuracy of eye tracking or makes it difficult or impossible to determine eye direction and/or gaze direction for the eye tracking.

In view of the above, it is therefore a general object of the embodiments of the present disclosure to provide an eye tracking system for reducing unwanted reflections from an optic arrangement.

This general object has been addressed by the appended independent claim 1. Advantageous embodiments are defined in the appended dependent claims.

In broad and general terms, the present disclosure proposes an eye tracking system having an illuminator arrangement, including at least one light source, wherein the illuminator arrangement is configured to emit p-polarized light.

According to a first aspect of this disclosure, an eye tracking system is provided. The eye tracking system comprises an illuminator arrangement, including at least one light source. The illuminator arrangement is configured to illuminate an eye of a user. The eye tracking system is configured to enable a reduction of reflections from an optic arrangement that is located in a light beam path between the illuminator arrangement and the eye—when the eye tracking system is in use.

The illuminator arrangement is configured to emit p-polarized light to be incident on a surface of the optic arrangement at an angle corresponding to, or substantially corresponding to, Brewster's angle. By emitting p-polarized light to be incident on the surface of the optic arrangement at an angle corresponding to, or substantially corresponding to, Brewster's angle it is possible to minimize or at least reduce (unwanted) reflections from an optic arrangement that is located in a light beam path between the illuminator arrangement and the eye.

For example, the optic arrangement mentioned above may be a pair of glasses (sometimes referred to as a pair of spectacles).

In advantageous embodiments, the illuminator arrangement includes a plurality of light sources. Each one of the plurality of light sources may be located at a fixed location in relation to the eye when the eye tracking system is in use.

In some embodiments, the illuminator arrangement may include at least one p-polarized light source. In some embodiments, the illuminator arrangement includes a plurality of p-polarized light sources. Each one of the plurality of p-polarized light sources may be located at a fixed location in relation to the eye when the eye tracking system is in use.

In alternative embodiments, the illuminator arrangement may include at least one polarizer (i.e., in addition to the at least one light source). The at least one polarizer may advantageously be positioned relative to the at least one light source to linearly polarize light emitted from the at least one light source to contain p-polarization only.

In an advantageous embodiment, the at least one polarizer comprises a polarizing film. For example, In some embodiments, the polarizer may comprise an absorptive polarizer, such as a Near Infra-Red (NIR) Linear Polarizing Film.

In some embodiments, the polarizer may comprise a beam-splitting polarizer, such as a thin film polarizer or a wire-grid polarizer.

In an alternative embodiment, the at least one polarizer comprises a sequence of multiple mirrors positioned relative to the at least one light source to reflect off a fraction of s-polarized light at each surface of the multiple mirrors to leave a p-polarized light beam.

In some embodiments, the eye tracking system comprises circuitry configured to: identify one or more reflections from the optic arrangement in the obtained image; and on a condition that there is at least one reflection from the optic arrangement; identify a light source of a plurality of light sources associated with the at least one reflection from the optic arrangement; and switch off the identified light source of the plurality of light sources.

In some embodiments, the eye tracking system may comprise an image sensor configured to detect light from the illuminator arrangement reflected from the eye and reflected from the optic arrangement located in the light beam path between the illuminator arrangement and the eye; and circuitry configured to obtain an image of the eye from the image sensor, the obtained image thereby being a representation of the eye; identify, in the obtained image, a pupil of the representation; identify, in the obtained image, one or more corneal reflections of the representation; and estimate a gaze based on the identified pupil and the identified one or more corneal reflections.

The eye tracking system discussed above may be implemented in an HMD. For example, the HMD may be embodied as a VR device or, alternatively, an AR device.

Various embodiments described herein allow for an improvement upon existing eye tracking systems and, in particular, eye tracking systems implemented in HMDs such as VR devices and AR devices. An important contribution to the existing art by the various embodiments described herein is based on the realization by the inventor that it is possible to reduce (unwanted) reflections from an optic arrangement (e.g., a pair of glasses) by providing an illuminator arrangement which is configured to emit p-polarized light to be incident on a surface of the optic arrangement at an angle corresponding to, or substantially corresponding to, Brewster's angle. This results in an inexpensive and non-complex solution for reducing the (unwanted) reflections from an optic arrangement, if/when an optic arrangement is located in a light beam path between the illuminator arrangement and an eye of the user.

BRIEF DESCRIPTION OF DRAWINGS

These and other aspects, features and advantages will be apparent and elucidated from the following description of various embodiments, reference being made to the accompanying drawings, in which.

DETAILED DESCRIPTION

The present invention will now be described more fully hereinafter. The invention may, however, be embodied in many different forms and should not be construed as limited to the embodiments set forth herein; rather, these embodiments are provided by way of example so that this disclosure will be thorough and complete, and will fully convey the scope of the invention to those users skilled in the art. Like reference numbers refer to like elements or method steps throughout the description.

As described earlier, some existing solutions are inadequate in that one or more reflections from an optic arrangement caused by the one or more of the illuminators may result in a situation where the pupil cannot be accurately identified or where no or too few corneal reflections can be identified for eye tracking. In one example, the optic arrangement is a pair of glasses. However, the optic arrangement may be any glass/plastic component in the head mounted display when in use, for example for protective purposes. The reflections from said optic arrangement are unwanted reflections.

Figure 1:
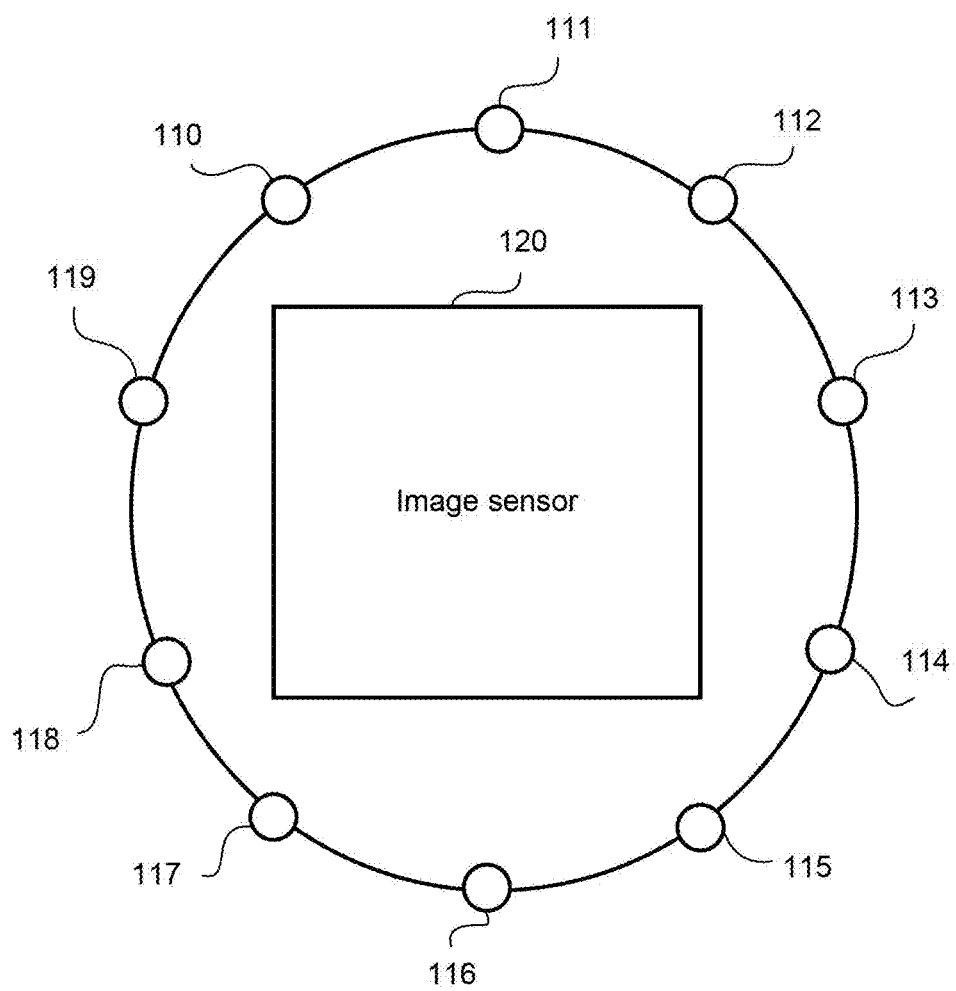
FIG. 1 illustrates a schematic view of parts of an eye tracking system.
Figure 2:
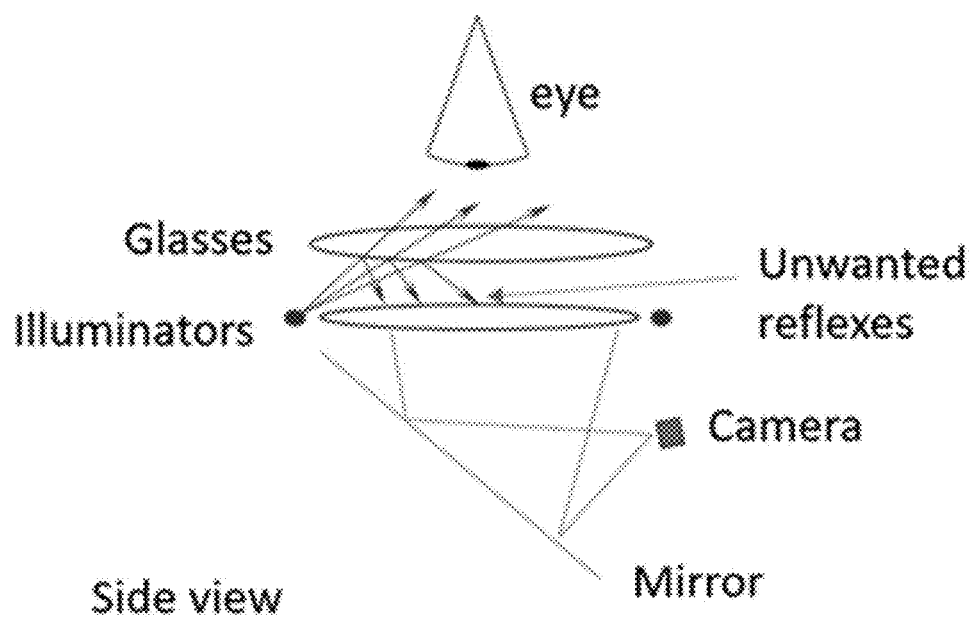
FIG. 2 shows a simplified illustration of a head mounted device (e.g., a VR/AR device) when a user is wearing a pair of glasses.
Figure 3:
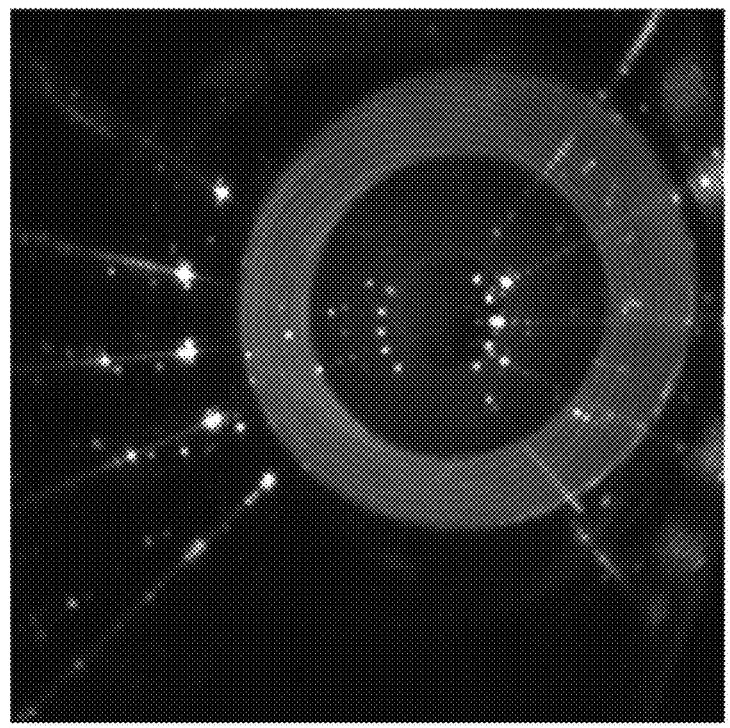
FIG. 3 illustrates a situation with unwanted reflections from an optic arrangement such as a pair of glasses.

To explain this is more detail, reference is now made to FIGS. 1-4. FIG. 1 illustrates an example embodiment of a common design of an illuminating arrangement of an eye tracking system implemented as an HMD such as a virtual reality (VR) headset, augmented reality (AR) glasses or a mixed reality (MR) headset. The illuminator arrangement includes light sources 110-119, for illuminating the eyes of a user. As can be seen in FIG. 1, the illuminator arrangement may comprise a plurality of light sources 110-119 placed at respective fixed locations in a ring or in any other configuration. An image sensor 120 may also be provided to capture images of the eyes of the user. If a user is wearing a pair of glasses, the light from the various light sources 110-119 may reflect on the surface of the glasses and into the surface (lens) of the HMD. FIG. 2 is a simplified illustration of an HMD (e.g., a VR headset) when a user is wearing a pair of glasses. As will be appreciated from FIG. 2, the pair of glasses may cause unwanted reflections. This may result in a situation where it is difficult to accurately identify the pupil and/or the corneal reflections (glints). In such situations it will be difficult, or sometimes even impossible, to determine eye direction and/or gaze direction or at least not with desirable reliability. FIG. 3 illustrates this situation from a lab environment.

Figure 4:
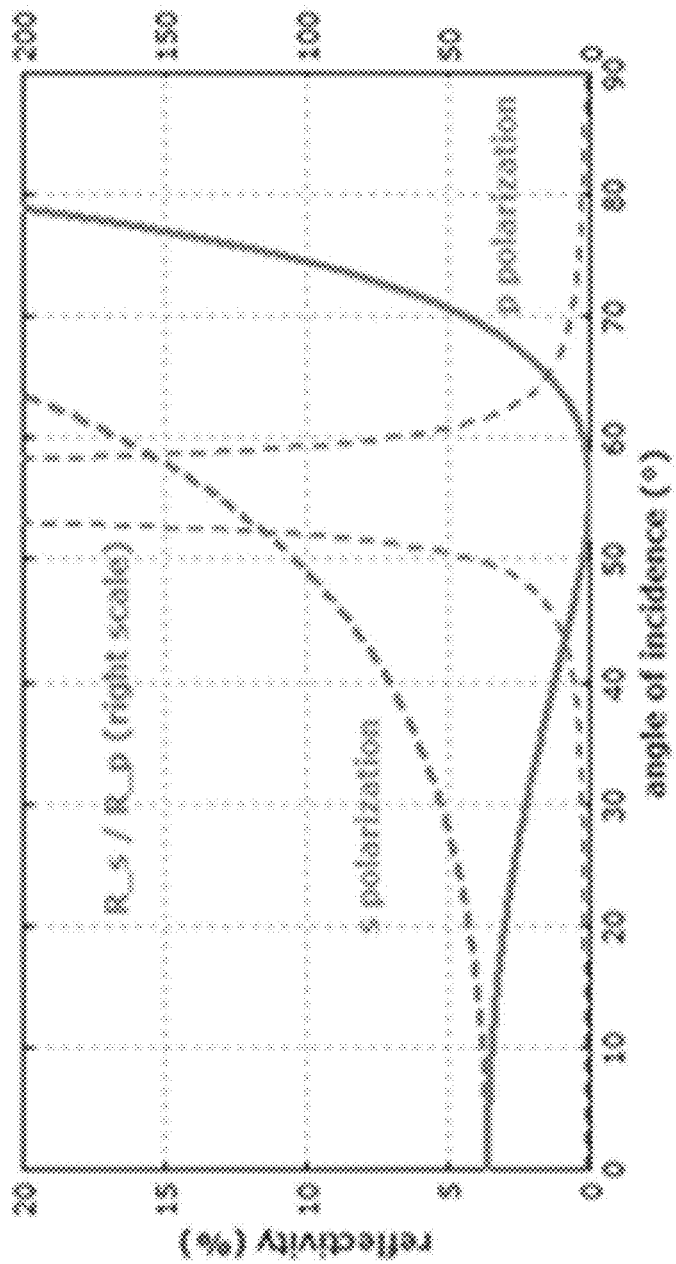
FIG. 4 shows reflection for the two orthogonal polarizations from a surface vs incident angle.

The present disclosure recognizes that, since the light from the plurality of light sources 110-119 will typically be incident on a surface of the glasses (the lenses) at a certain angle, the reflectivity will be dependent on the polarization of the incoming light and the angle if incidence, see FIG. 4.

It is in view of the above considerations and others that the various embodiments disclosed throughout this disclosure have been made. The present disclosure recognizes that it would be desirable to provide an eye tracking technology to account for situations where unwanted reflections from an optic arrangement (e.g., a pair of glasses worn when a user operates or otherwise uses an HMD, such as a VR device) reduce the accuracy of eye tracking or makes it difficult or impossible to determine eye direction and/or gaze direction for the eye tracking.

In view of the above, it is therefore a general object of the embodiments of the present disclosure to provide an eye tracking system for reducing (unwanted) reflections from an optic arrangement that is located in a light beam path between an illuminator arrangement and an eye of a user—when the eye tracking system is in use.

To address this, the present disclosure proposes—in broad and general terms—an eye tracking system having an illuminator arrangement, including at least one light source, wherein the illuminator arrangement is configured to emit p-polarized light.

Figure 5:
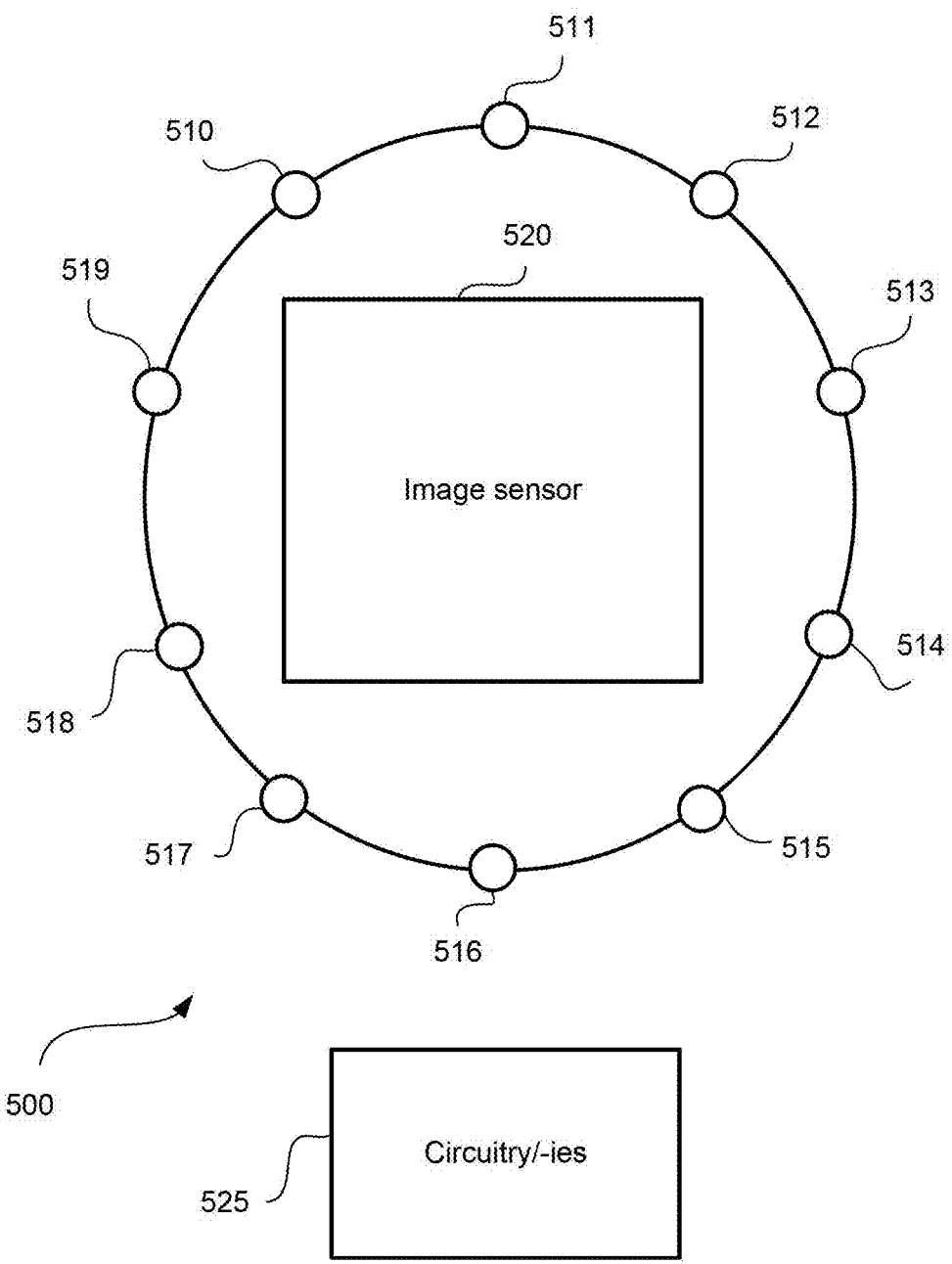
FIG. 5 illustrates a schematic view of an eye tracking system.

Accordingly, an eye tracking system 500 is provided. Reference is now made to FIG. 5. The eye tracking system 500 comprises an illuminator arrangement, including at least one light source. Advantageously, but not necessarily, the illuminator arrangement comprises a plurality of light sources 510-519 as illustrated in FIG. 5. Each one of the plurality of light sources 510-519 may be located at a fixed location in relation to the eye when the eye tracking system is in use. In the example of FIG. 5, the plurality of light sources 510-519 are placed, or otherwise located in a ring, or any other configuration.

Figure 6:
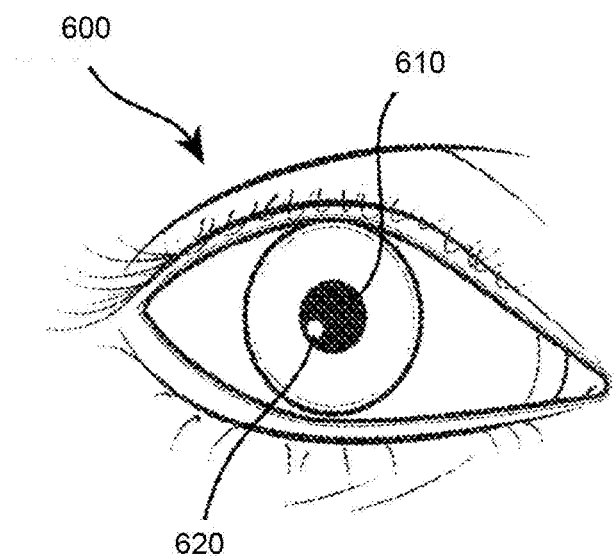
FIG. 6 shows an example image of an eye.

An image sensor 520 may also be provided. The image sensor 520 may be configured to detect light from the illuminator arrangement reflected from the eye and reflected from the optic arrangement located in the light beam path between the illuminator arrangement and the eye. It is to be noted that the location of the image sensor in FIG. 5 is only for illustrative purposes. FIG. 6 shows an example of an image of an eye 600 captured by the image sensor 520 of FIG. 5. The circuitry 525 (see FIG. 5) may, for example, be configured to: obtain an image of the eye 600 from the image sensor 520, the obtained image thereby being a representation of the eye; identify, in the obtained image, a pupil 610 of the representation; identify, in the obtained image, one or more corneal reflections 620 of the representation; and estimate a gaze based on the identified pupil 610 and the identified one or more corneal reflections 620.

The eye tracking system 500 is configured to enable a reduction of reflections from an optic arrangement (e.g., a pair of glasses) that is located in a light beam path between the illuminator arrangement and the eye—when the eye tracking system is in use. In more detail, the illuminator arrangement is configured to emit p-polarized light to be incident on a surface of the optic arrangement at an angle corresponding to, or substantially corresponding to, Brewster's angle.

By emitting p-polarized light to be incident on the surface of the optic arrangement at an angle corresponding to, or substantially corresponding to, Brewster's angle it is possible to minimize or at least reduce (unwanted) reflections from an optic arrangement that would otherwise occur.

In the existing eye tracking systems, the light from the illuminator arrangement is typically un-polarized. This light will be partially polarized when reflected at the surface of the optic arrangement (e.g., glasses) since it is reflected at a high angle. This disclosure builds on the inventor's realization that by linearly polarizing light emitted from the illuminator arrangement (including the at least one light source 510-519) to contain p-polarization only it is made possible to minimize, or at least reduce, unwanted reflections from an optic arrangement that is located in a light beam path between the illuminator arrangement and the eye of the user.

An optimum angle, where the reflection is minimized, generally depends on the refractive index of the surface of the optic arrangement (e.g., the lens of the glasses) and is generally given by Brewster's law:

$$\theta_B = \arctan\left(\frac{n_2}{n_1}\right) \quad \text{(Eq. 1)}$$

where $n_1$ is the refractive index of the initial medium (air) through which the light propagates (the "incident medium"), and $n_2$ is the index of the other medium (the surface of the optic arrangement). The angle defined by the above formula is known as Brewster's angle. Based on this realization by the inventor, this disclosure therefore proposes to provide an eye tracking system having an illuminator arrangement, which is configured to emit p-polarized light to be incident on a surface of the optic arrangement at an angle corresponding to, or substantially corresponding to, Brewster's angle. When the p-polarized light is incident on a surface of the optic arrangement at this angle, it is possible to substantially reduce, minimize or even eliminate unwanted reflections from the optic arrangement that would otherwise occur.

Figure 7:
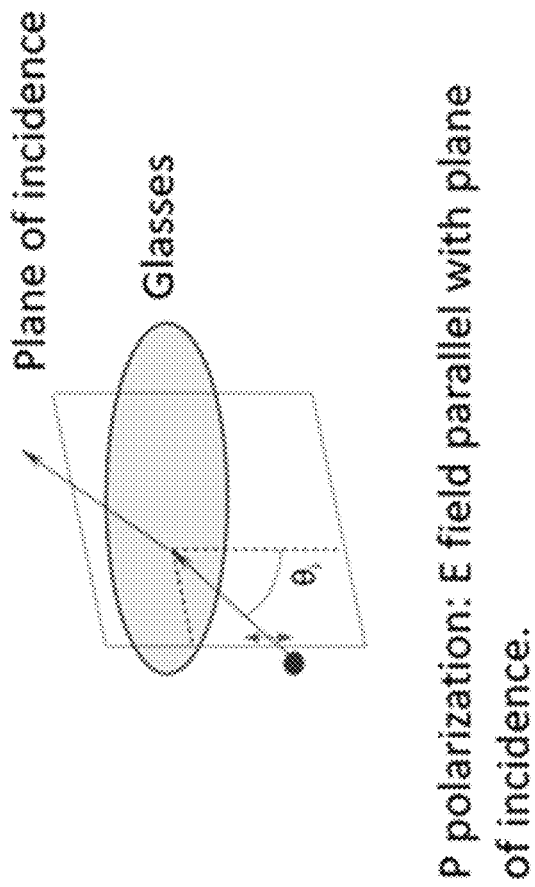
FIG. 7 illustrates that the polarization of an illuminator arrangement may advantageously be set to correspond to the p-polarization with respect to the reflecting surface of the optic arrangement.

The polarization of the illuminator arrangement may advantageously be set to correspond to the p-polarization with respect to the reflecting surface of the optic arrangement. In other words, it may be advantageous to set the polarization for the individual light sources (see FIG. 7) to enable that only p-polarization is present with respect to the surface the optic arrangement (e.g., the lens surface of a pair of glasses) to be used when the eye tracking system is in use.

Figure 8A:
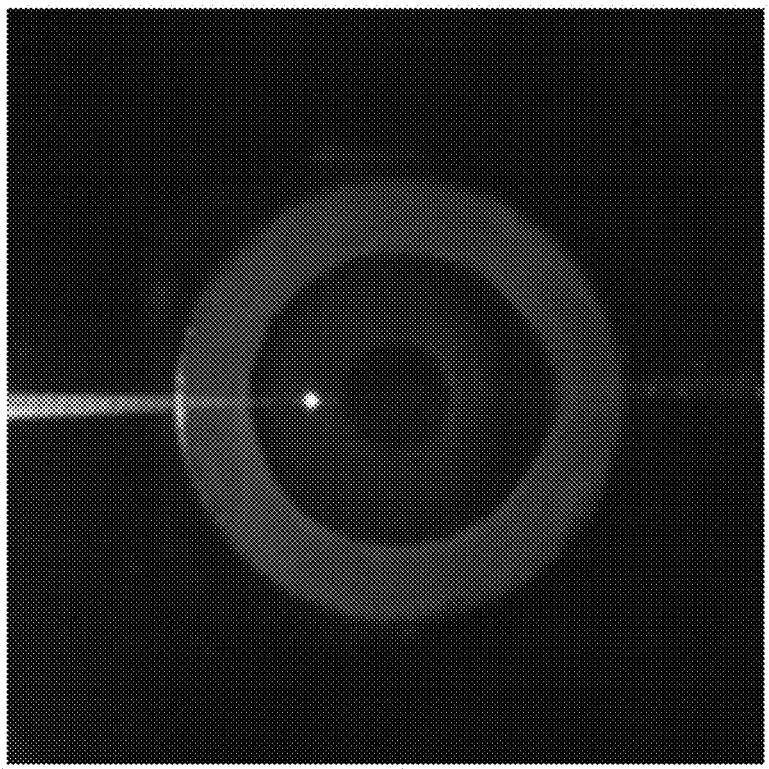
FIGS. 8A-8B illustrate that embodiments of this disclosure may allow for a reduced number of reflections from an optic arrangement, such as a pair of glasses.
Figure 8B:
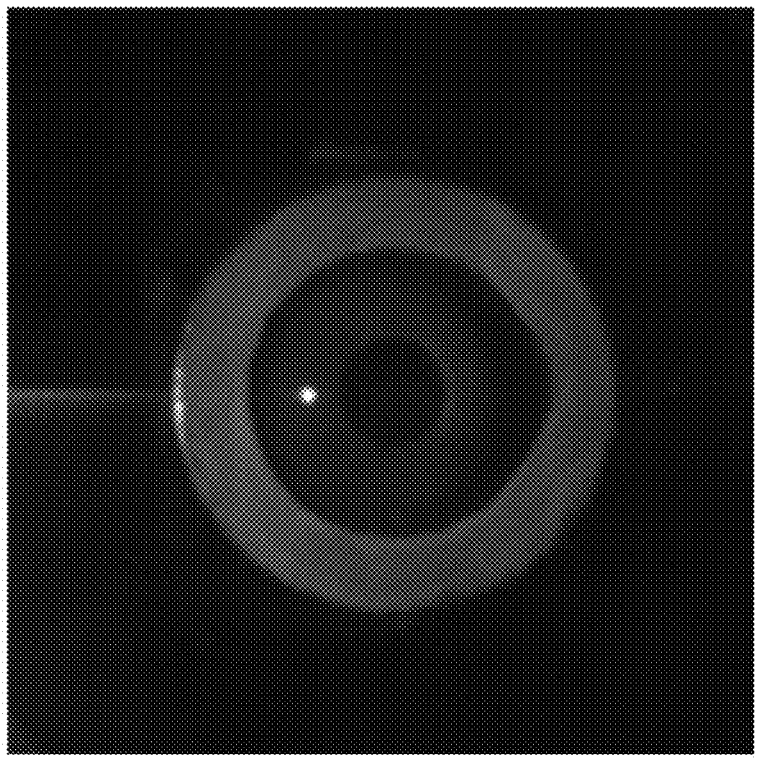

In order to verify that unwanted reflections from an optic arrangement located in a light beam path between the illuminator arrangement and the eye—when the eye tracking system is in use—the inventor has performed tests in a test lab. FIGS. 8A-8B illustrate an image of the same eye from a test in the test lab. FIG. 8A shows the image of the eye when an illuminator arrangement with a single un-polarized light source was used. FIG. 8B shows the image of the eye when an illuminator arrangement, including a single light source, provided with polarization according to aspects disclosed throughout this disclosure. As can be seen from FIG. 8B, the unwanted reflections have been reduced (cf. FIG. 8A, see left-hand side of FIGS. 8A and 8B, respectively).

Various Detailed Implementation Examples

There exist various ways to implement an illuminator arrangement, which is configured to emit p-polarized light to be incident on a surface of the optic arrangement at an angle corresponding to, or substantially corresponding to, Brewster's angle. Certain advantageous implementations examples are presented in the following. When reducing the teachings of this disclosure into practice, the person skilled in the art is advised to test and evaluate which implantation example that is best fitted to his/her need with respect to his/her eye tracking system.

1. P-Polarized Light Source(s):

In some embodiments, the illuminator arrangement may comprise p-polarized light sources. This implementation example may be advantageous in that it requires few modifications with respect to today's illuminator arrangements. For example, each one of the light sources 510-519 (see FIG. 5) may be embodied as p-polarized light sources.

2. Separate Polarizer(s)

In some embodiments, the illuminator arrangement additionally includes at least one polarizer. The at least one polarizer may advantageously be positioned relative to the at least one light source to linearly polarize light emitted from the at least one light source to contain p-polarization only.

For example, if the illuminator arrangement includes a plurality of light sources, each one of a plurality of polarizers may be positioned relative to a respective one of the plurality of light sources to linearly polarize the respective light source to contain p-polarization only. In some embodiments, the at least one light source may be an un-polarized light source.

As is appreciated, the at least one polarizer may thus be embodied as at least one linear polarizer. Certain examples are identified below:

2A. Absorptive Polarizer(s)

In advantageous embodiments, the at least one polarizer may comprise an absorptive polarizer. In one example, the absorptive polarizer is a polarizing film. For example, if the illuminator arrangement includes a plurality of light sources, a polarizing film may be applied, or otherwise coated, onto a respective one of the plurality of light sources. In another example, the polarizing film is placed or mounted in front of a respective one of the plurality of light sources, i.e. in the light beam path of the respective light source. The polarizing film may be a Near Infra-Red (NIR) Linear Polarizing Film. A polarizing film is advantageous in that it requires little space and easy to implement. Common examples of absorptive polarizer are dichroic polarizers, such as dichroic polymer polarizers and dichroic glass polarizers. Other absorptive polarizer(s) are also conceivable. Other examples, such as wire grid polarizers may, in some cases, be implemented as an absorptive polarizer.

2B: Beam-Splitting Polarizer(s)

In alternative embodiments, the at least one polarizer may comprise a sequence of multiple mirrors positioned relative to the at least one light source to reflect off a fraction of s-polarized light at each surface of the multiple mirrors to leave a p-polarized light beam. Other beam-splitting polarizer(s) are also conceivable, e.g thin film polarizers or wire-grid polarizers. Thin film polarizers and wire-grid polarizers can be made rather thin, similar to absorptive polarizers. At least some of the beam-splitting polarizers, such as wire-grid polarizers, may be referred to as reflective polarizers.

Both absorptive polarizer(s) and beam-splitting polarizer(s) are hence conceivable for reducing embodiments of the present disclosure into practice. Absorptive polarizers may generally be preferred since they can usually be made thinner than some thicker beam-splitting polarizers, such as beam splitter cubes or crystalline polarizers. Thus, absorptive polarizer(s) may offer a less complex and inexpensive solution.

Various embodiments described herein allow for an improvement upon existing eye tracking systems and, in particular, eye tracking systems implemented in HMDs such as VR devices and AR devices. An important contribution to the existing art by the various embodiments described herein is based on the realization by the inventor that it is possible to reduce unwanted reflections from an optic arrangement (e.g., a pair of glasses) by providing an illuminator arrangement which is configured to emit p-polarized light to be incident on a surface of the optic arrangement at an angle corresponding to, or substantially corresponding to, Brewster's angle. This results in an inexpensive and non-complex solution for reducing the (unwanted) reflections from an optic arrangement, if/when an optic arrangement is located in a light beam path between the illuminator arrangement and an eye of the user.

In order to provide an eye tracking system, which is configured to enable a reduction of reflections from an optic arrangement that is located in a light beam path between the illuminator arrangement and the eye when the eye tracking system is in use, some advantageous embodiments of the present invention may additionally provide control of one or more of the light sources. For example, the eye tracking system may comprise circuitry 525 configured to: identify one or more reflections from the optic arrangement in the obtained image; and on a condition that there is at least one reflection from the optic arrangement; identify a light source of a plurality of light sources associated with the at least one reflection from the optic arrangement; and switch off the identified light source of the plurality of light sources.

Various options for identifying one ore more light sources that cause(s) (unwanted) reflections exist. A first possible option is to turn on the light sources of a plurality of light sources 510-519, one at the time, when a user has put or otherwise mounted the HMD on his/her head, to evaluate a level of unwanted reflections from each one of the light sources. A second option would be to operate all light sources until a problem with unwanted reflections occurs (e.g., gaze could not be determined or determined with poor quality due to unwanted reflections) and then evaluate which light source(s) to switch off by, for example, testing one light source at a time or all but one light source at a time. Other options are also conceivable.

The embodiments of this disclosure may also be implemented together with teachings from the U.S. Pat. No. 10,342,425 (assigned to Tobii AB), the entire contents of which are hereby incorporated by reference in its entirety.

As discussed herein, various embodiments described herein thus allow for an improvement upon existing eye tracking systems and, in particular, eye tracking systems implemented in HMDs such as VR devices and AR devices. Unwanted reflections from an optic arrangement (e.g., a pair of glasses) may be reduced by the provision of an illuminator arrangement which is configured to emit p-polarized light to be incident on a surface of the optic arrangement at an angle corresponding to, or substantially corresponding to, Brewster's angle. This results in an inexpensive a non-complex solution for reducing the (unwanted) reflections from an optic arrangement, if/when an optic arrangement is located in a light beam path between the illuminator arrangement and an eye of the user.

The invention claimed is:

1. An eye tracking system implemented in a Head Mounted Device, comprising:
   an illuminator arrangement, including at least one light source, configured to illuminate an eye of a user, wherein the illuminator arrangement includes a plurality of light sources and at least one p-polarized light source;

wherein the eye tracking system is configured to enable a reduction of reflections from an optic arrangement that is located in a light beam path between the illuminator arrangement and the eye when the eye tracking system is in use, and wherein the eye tracking system is characterized in that the illuminator arrangement is configured to emit p-polarized light to be incident on a surface of the optic arrangement at an angle corresponding to, or substantially corresponding to, Brewster's angle.

2. The eye tracking system of claim 1, wherein the optic arrangement is a pair of glasses.

3. The eye tracking system of claim 1, wherein the illuminator arrangement further includes at least one polarizer, wherein the at least one polarizer is positioned relative to the at least one light source to linearly polarize light emitted from the at least one light source to contain p-polarization only.

4. The eye tracking system of claim 3, wherein the at least one polarizer comprises a polarizing film.

5. The eye tracking system of claim 3, wherein the at least one polarizer comprises an absorptive polarizer, such as a Near Infra-Red, NIR, Linear Polarizing Film.

6. The eye tracking system of claim 3, wherein the at least one polarizer comprises a beam-splitting polarizer, such as a thin film polarizer or a wire-grid polarizer.

7. The eye tracking system of claim 3, wherein the at least one polarizer comprises a sequence of multiple mirrors positioned relative to the at least one light source to reflect off a fraction of s-polarized light at each surface of the multiple mirrors to leave a p-polarized light beam.

8. The eye tracking system of claim 1, comprising circuitry configured to:
   identify one or more reflections from the optic arrangement in the obtained image; and
   on a condition that that there is at least one reflection from the optic arrangement;
   identify a light source of a plurality of light sources associated with the at least one reflection from the optic arrangement; and
   switch off the identified light source of the plurality of light sources.

9. The eye tracking system of claim 1, comprising:
   an image sensor configured to detect light from the illuminator arrangement reflected from the eye and reflected from the optic arrangement located in the light beam path between the illuminator arrangement and the eye; and
   a circuitry configured to:
   obtain an image of the eye from the image sensor, the obtained image thereby being a representation of the eye;
   identify, in the obtained image, a pupil of the representation; fixed
   identify, in the obtained image, one or more corneal reflections of the representation; and
   estimate a gaze based on the identified pupil and the identified one or more corneal reflections.

10. The eye tracking system of claim 1, wherein the HMD is a Virtual Reality, VR, Device.

11. The eye tracking system of claim 1, wherein the HMD is an Augmented Reality, AR, Device.

* * * * *